United States Patent [19]

Haditsch

[11] Patent Number: 5,300,847
[45] Date of Patent: Apr. 5, 1994

[54] ROTOR OF AN ELECTRICAL MACHINE HAVING AN EXCITATION CURRENT SUPPLY LINE

[75] Inventor: Werner Haditsch, Nussbaumen, Switzerland

[73] Assignee: Asea Brown Boveri Ltd., Baden, Switzerland

[21] Appl. No.: 988,192

[22] Filed: Dec. 9, 1992

[30] Foreign Application Priority Data

Dec. 18, 1991 [DE] Fed. Rep. of Germany ....... 4141690

[51] Int. Cl.$^5$ .............................................. H02K 9/00
[52] U.S. Cl. ............................................. 310/61; 310/59
[58] Field of Search ....................... 310/52, 58, 61, 59, 310/62, 63, 60 R, 60 A

[56] References Cited

U.S. PATENT DOCUMENTS

| | | | |
|---|---|---|---|
| 4,066,921 | 1/1978 | Blank | 310/61 |
| 4,074,155 | 2/1978 | Haditsch et al. | 310/59 |

FOREIGN PATENT DOCUMENTS

| | | |
|---|---|---|
| 0384241 | 8/1990 | European Pat. Off. . |
| 0584477 | 1/1977 | Switzerland . |
| 0586966 | 4/1977 | Switzerland . |

Primary Examiner—Steven L. Stephan
Assistant Examiner—Judson H. Jones
Attorney, Agent, or Firm—Oblon, Spivak, McClelland, Maier & Neustadt

[57] ABSTRACT

In large electrical machines, the electrical connection between the excitation supply line (7, 8), which runs axially, centrally in the rotor, and the excitation winding conductors (4) in the winding overhang (3) of the rotor is highly stressed electrically and mechanically. It must therefore be forced-cooled. Effective cooling can be achieved if a portion of the cooling gas from the cold gas chambers is guided through special radial shaft holes (20) to the shaft axis and then radially outwards through or along the excitation supply line bolt (13) into the hot gas space (H) in the rotor winding overhang space.

10 Claims, 3 Drawing Sheets

# ROTOR OF AN ELECTRICAL MACHINE HAVING AN EXCITATION CURRENT SUPPLY LINE

BACKGROUND OF THE INVENTION

1. Field of the Invention

The invention relates to a rotor of a gas-cooled electrical machine, especially a turbogenerator, having an excitation winding arranged in longitudinal slots on the outer circumference of the rotor body, having an excitation current supply line for connection of the excitation line, which runs centrally in the rotor in an axial shaft hole, to the excitation winding conductors in the winding overhang of the rotor, having a forced-cooled excitation supply line bolt, which is arranged in a first radial shaft hole and is electrically and mecanically connected at its inner end to the excitation line, and at its outer end, outside the rotor shaft, via connecting conductors to the conductors of the rotor winding overhang, which rotor has a rotor cap to support the winding overhang of the rotor, the rotor winding overhang space being split underneath the rotor cap by separating walls, which run essentially axially, into cold and hot gas chambers, through which cooling gas, conveyed by a fan, flows.

In this case, the invention makes reference to a prior art, as results, for example, from CH-PS 586,966.

2. Discussion of Background

In turbogenerators, the excitation lines are normally guided on the rotor to the rotor winding in a central shaft hole. The conductors in the shaft hole are generally solid and insulated all round. The connection from these centrally guided solid conductors to the rotor winding is produced via current supply line bolts which are screwed radially into the solid conductors. Such a bolt is, for example, the subject matter of the CH Patent Specification 586,966. In addition to bolts consisting of copper or of a copper alloy, bolts consisting of high-tensile steel are used in more recent designs, which must then be forced-cooled.

The bolt is located in a shaft section which is subject to extremely high stresses because of the shaft bending as a result of the intrinsic weight of the rotor and unbalanced forces. The rotor shaft is weakened by a (radial) hole in this shaft section. In the most unfavorable case, cracks can form in the region of the bolt hole, which may lead to damage.

SUMMARY OF THE INVENTION

The invention is based on the object of constructing the excitation current supply line between the solid conductors in the central shaft hole and the actual winding connection on the rotor winding overhang in such a manner that neither the shaft nor the electrical connection is mechanically endangered, and effective cooling is possible.

This object is achieved according to the invention in that the first shaft holes for holding the excitation current supply line bolts open into in each case one hot gas chamber and in that the central shaft hole is connected via second shaft holes, which run essentially radially., to the cold gas chambers, so that cooling gas flows from the cold gas chambers through the first radial shaft holes, the axial shaft hole and through the second radial shaft holes.

In this case, the first radial shaft holes are preferably offset in the circumferential direction with respect to the second radial shaft hole, and the second radial shaft holes are preferably arranged in the region of the transition point from the shaft to the rotor body, and open into a space in the center of the rotor shaft. These holes can be incorporated in this region without endangering the rotor. It is particularly advantageous if the second radial shaft holes originate from the (existing) winding slots close to the pole center. For this purpose, the ends of the relevant slots are widened towards the rotor axis in the manner of a base slot.

An exemplary embodiment of the invention and the advantages which can be achieved with it are explained in more detail in the following text, using the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
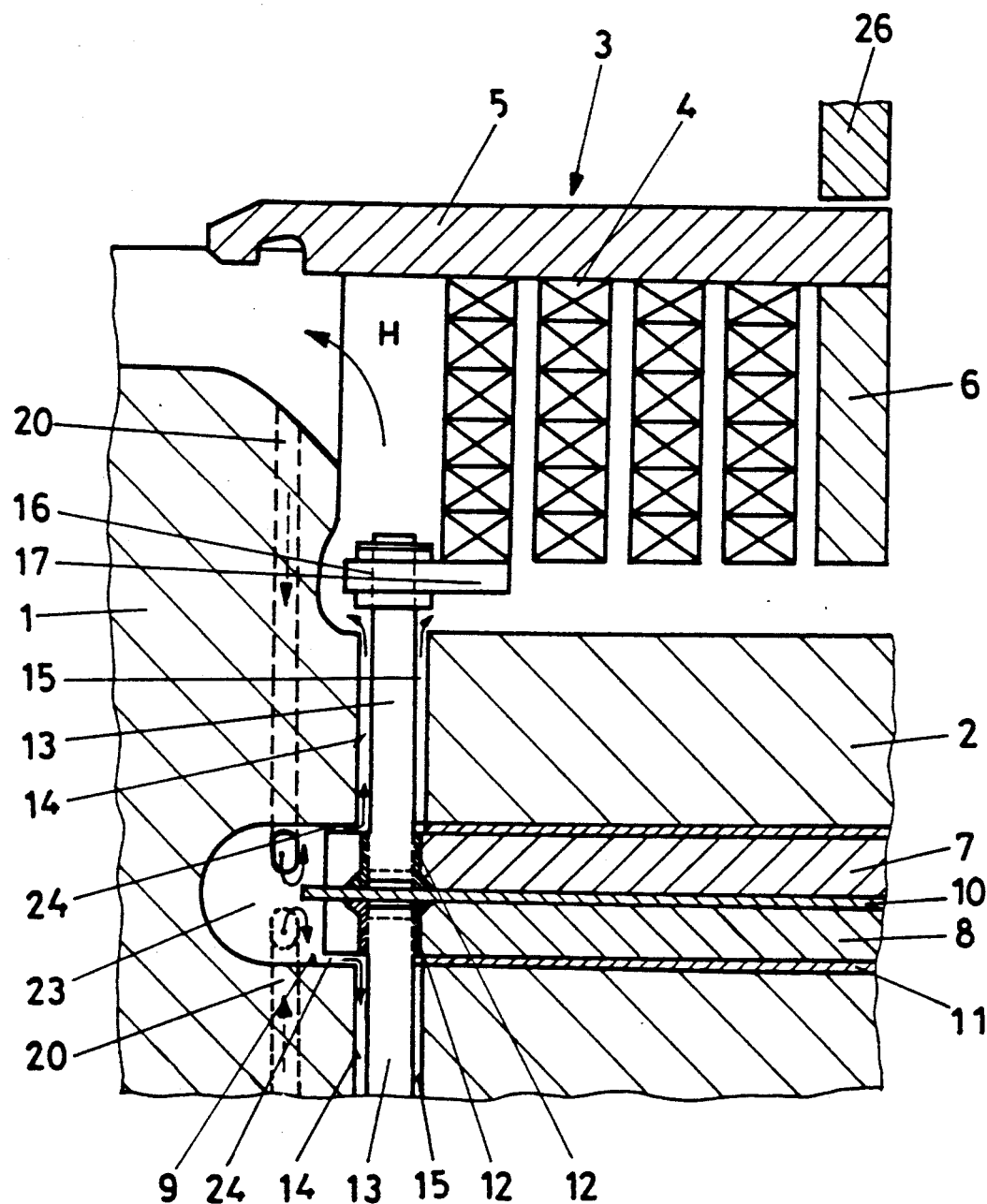
FIG. 1 shows a simplified longitudinal section through the winding overhang of the rotor of a turbogenerator, in the region of the excitation supply line bolt.

Referring now to the drawings, wherein like reference numerals designate identical or corresponding parts throughout the several views, in FIG. 1, which shows a longitudinal section through the low-voltage winding overhang of the rotor of a turbogenerator, the rotor body is designated by 1 and the rotor shaft is designated by 2. The rotor winding conductors 4, which are designed as hollow conductors, are connected to one another in the rotor winding overhang 3 in a known manner. A rotor cap, consisting of a cap ring 5 and a cap plate 6, is used to support the rotor winding overhang 3.

The excitation current is supplied to the excitation winding via solid conductors 7, 8, which are provided in a central shaft hole 9, running axially, in the rotor shaft 2. The solid conductors 7, 8 are electrically insulated from one another by an intermediate insulating layer 10. An insulating tube 11, which is inserted into the shaft hole 9, is used for insulation of the solid conductors 7, 8 with respect to the rotor shaft 2.

At the end of the winding overhang side, the two solid conductors 7, 8 are provided with a radial hole into which in each case one threaded insert 12 is incorporated. In each case one excitation supply line bolt 13, which is arranged in a first radial shaft hole 14, is screwed into the threaded insert 12. Its external diameter is smaller than the unobstructed width of the first radial shaft hole 14, so that a cooling gap 15 is produced through which a cooling gas can be ducted. Instead of a cooling gap 15, the bolt 13 can also be designed to be partially hollow. The radially outer end of the excitation supply line bolt 13 is provided with a thread 16 on which a connecting conductor 17 is mounted for the electrical connection of the excitation supply line bolt 13 to the rotor winding conductors 4 of the winding overhang 3.

Figure 2:
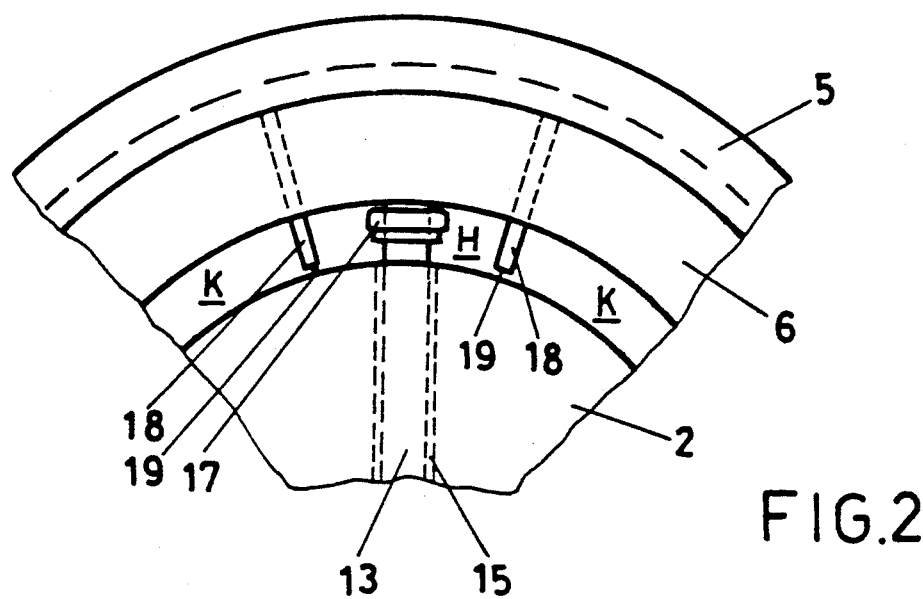
FIG. 2 shows a section of a plan view of the winding overhang according to FIG. 1.

As FIG. 2 shows, the rotor winding overhang space is split underneath the cap ring 5 by separating walls 18, which run axially, into a plurality of hot gas chambers H (only o can be seen in FIG. 2) and cold gas chambers K. These extend up to the shaft 2, leaving a small gap 19. These chambers are bounded axially by the cap plate 6 and the rotor body 1.

Cold gas flowing from the machine fan (not shown) into the cold gas chambers K enters into lateral openings in the hollow winding conductors 4, flows through them and leaves them (in the case of machines which are ventilated on both sides, on the opposite side of the rotor) via the hot gas chambers H into the machine air gap. The cooling gas likewise flows from the cold gas chambers K into lateral openings in hollow winding bars, which are arranged in the rotor slots shown in FIG. 3, flows through them, and leaves them centrally in the rotor, passing into the machine air gap.

Figure 4:
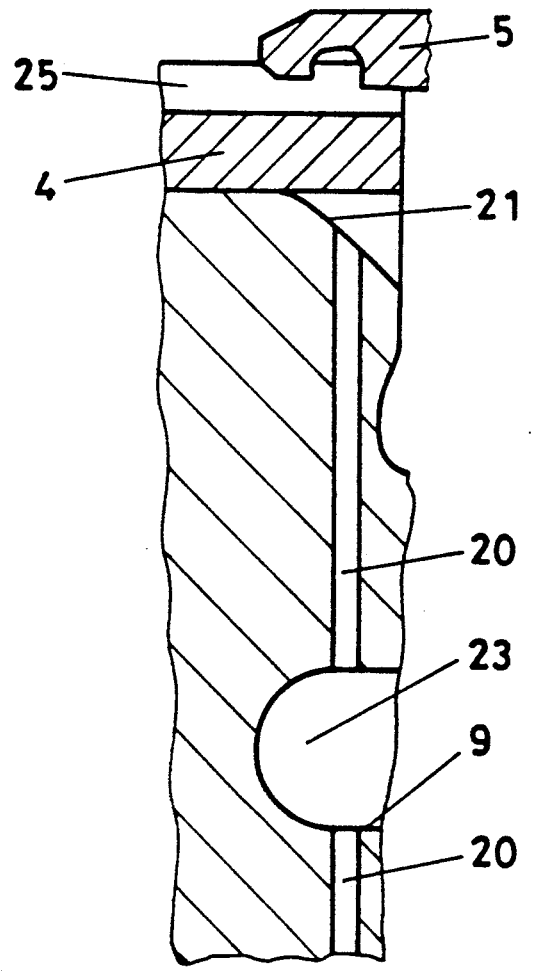
FIG. 4 shows a simplified longitudinal section in the region of the second radial shaft hole of the turbogenerator according to FIGS. 1 and 3.

According to the invention, a portion of the cold gas is now branched off for cooling the excitation supply line bolt 13. For this purpose, a second radial shaft hole 20 is provided in the rotor body according to FIG. 4, which shaft hole 20 originates from a rotor slot 21, which is adjacent to the hot gas chamber H and hence to the pole center 22, and ends in the axial shaft hole 9, to be precise in the space 23 between the base of the axial shaft hole 9 and the solid conductors 7, 8. The rotor slot 21 is widened at the end of the body in the manner of a base slot. The space 23 is connected via ducts 24 to the cooling gap 15, for example by corresponding recesses in the ends of the solid conductors 7 and 8 or by short slots in the insulating tube 11. For completeness, FIG. 4 also shows the slot closure 25 for the rotor winding and an air gap aperture 26. The latter prevents, in a known manner, the cooling gas which is conveyed by the machine fan flowing directly into the machine air gap.

Figure 3:
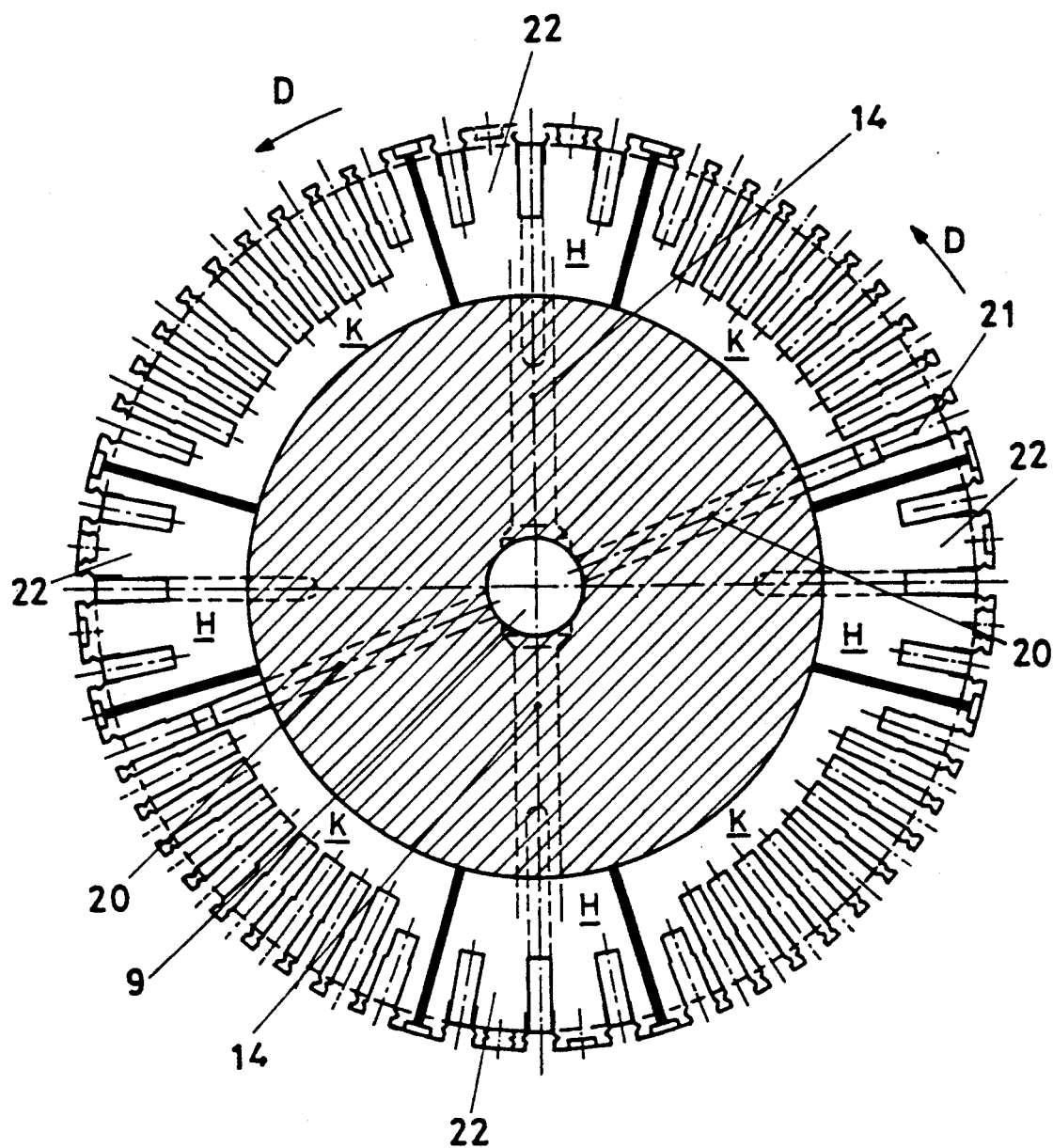
FIG. 3 shows a view of the rotor without the winding from the side opposite the input drive.

Fresh cooling gas is always available in the cold gas chambers at approximately the fan pressure. The radial position of the gas inlet into the second radial shaft holes 20 and the gas outlet from the first radial shaft holes 14 also provides additional conveyance for the cooling agent, because of centrifugal forces. If, in addition, as is shown in FIG. 3, the second radial shaft holes 20 are offset in the circumferential direction with respect to the (symbolized by arrows D) rotation direction of the rotor so that, seen in the rotation direction, they come to rest at the end of the cold gas chamber K, the dynamic pressure also assists in the conveyance of the cooling agent.

The measures described above for the forced cooling of the excitation supply line bolt were described by way of example on a four-pole turbogenerator. They can also be implemented on two-pole machines, without leaving the context covered by the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A rotor of a gas-cooled electrical machine comprising:
    a rotor body;
    an excitation winding arranged in longitudinal slots on an outer circumference of the rotor body in a winding overhang of the rotor;
    an excitation current supply line which runs centrally in the rotor in an axial shaft hole;
    a forced-cooled excitation supply line bolt arranged in a first radial shaft hole, and being electrically connected at its inner end to the excitation current supply line and being electrically connected at its outer end to the excitation winding;
    a rotor cap supporting the winding overhang of the rotor;
    at least one separating wall for splitting the winding overhang underneath the rotor cap into at least one cold and hot gas chamber through which a cooling gas flows, wherein the first radial shaft hole opens into the at least one hot gas chamber;
    a second radial shaft hole connecting the at least one cold gas chamber to the axial shaft hole, so that the cooling gas flows from the at least one cold gas chamber through the second radial shaft hole, through the axial shaft hole and through the first radial shaft hole.

2. The rotor according to claim 1, wherein the first radial shaft hole is offset in a circumferential direction of the rotor with respect to the second radial shaft hole.

3. The rotor according to either one of claims 1 or 2, wherein the second radial shaft hole is arranged in a region of a transition point from a shaft of the rotor to the rotor body, and opens into a space in a center of the rotor.

4. The rotor according to claim 3, wherein the second radial shaft hole originates from slots which are adjacent to a pole center of the rotor.

5. The rotor according to either one of claims 1 or 2, wherein the excitation supply line bolt is provided with a cooling hole running in a longitudinal direction of the bolt.

6. The rotor according to claim 3, wherein the excitation supply line bolt is provided with a cooling hole running in a longitudinal direction of the bolt.

7. The rotor according to claim 4, wherein the excitation supply line bolt is provided with a cooling hole running in a longitudinal direction of the bolt.

8. The rotor according to either one of claims 1 or 2, further comprising a cooling gap between the excitation supply line bolt and a wall of the first radial shaft hole.

9. The rotor according to claim 3, further comprising a cooling gap between the excitation supply line bolt and a wall of the first radial shaft hole.

10. The rotor according to claim 4, further comprising a cooling gap between the excitation supply line bolt and a wall of the first radial shaft hole.

* * * * *